(12) United States Patent
Klinkigt et al.

(10) Patent No.: US 11,537,750 B2
(45) Date of Patent: Dec. 27, 2022

(54) IMAGE ACCESS MANAGEMENT DEVICE, IMAGE ACCESS MANAGEMENT METHOD, AND IMAGE ACCESS MANAGEMENT SYSTEM

(71) Applicant: Hitachi, Ltd., Tokyo (JP)

(72) Inventors: Martin Klinkigt, Tokyo (JP); Mohit Chhabra, Tokyo (JP); Atsushi Hiroike, Tokyo (JP); Tomokazu Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 16/879,224

(22) Filed: May 20, 2020

(65) Prior Publication Data

US 2020/0380168 A1 Dec. 3, 2020

(30) Foreign Application Priority Data

Jun. 3, 2019 (JP) .............................. JP2019-103698

(51) Int. Cl.
*G06F 21/62* (2013.01)
*G06N 5/04* (2006.01)
(Continued)

(52) U.S. Cl.
CPC ...... *G06F 21/6254* (2013.01); *G06F 21/6263* (2013.01); *G06N 3/08* (2013.01);
(Continued)

(58) Field of Classification Search
CPC ............. G06F 21/6254; G06F 21/6263; G06F 2221/2113; G06N 20/00; G06N 3/08;
(Continued)

(56) References Cited

U.S. PATENT DOCUMENTS 8,717,604 B2 * 5/2014 Hashimoto ........ H04N 1/00344
358/1.18
9,916,538 B2 * 3/2018 Zadeh .................. A61B 5/7221
(Continued)

FOREIGN PATENT DOCUMENTS

JP 2007-213181 A 8/2007
JP 2019-71050 A 5/2019

OTHER PUBLICATIONS

Extended European Search Report issued in European Application No. 20169799.2 dated Oct. 12, 2020 (10 pages).
(Continued)

*Primary Examiner* — Hosuk Song
(74) *Attorney, Agent, or Firm* — Crowell & Moring LLP

(57) ABSTRACT

In a case of receiving an access request to a target image, an image access management device can provide an appropriate access right holder with an appropriate range of information by determining a browsing level with respect to the target image according to an access authority or purpose included in the access request to the target image, by an access management unit, by generating a final image that corresponds to the access authority by processing the feature vector according to the browsing level, and providing the generated final image as a response to the access request, by an image generation unit.

13 Claims, 11 Drawing Sheets

(51) Int. Cl.
 *G06N 20/00* (2019.01)
 *G06N 3/08* (2006.01)
 *G06T 5/00* (2006.01)
(52) U.S. Cl.
 CPC .............. *G06N 5/046* (2013.01); *G06N 20/00* (2019.01); *G06T 5/002* (2013.01); *G06F 2221/2113* (2013.01); *G06T 2207/20081* (2013.01); *G06T 2207/20084* (2013.01)
(58) Field of Classification Search
 CPC .................... G06N 5/046; G06T 5/002; G06T 2207/20081; G06T 2207/20084
 See application file for complete search history.

(56) References Cited

U.S. PATENT DOCUMENTS

| | | | | |
|---|---|---|---|---|
| 9,985,989 B2* | 5/2018 | Touboul | .............. | H04L 63/1441 |
| 11,175,653 B2* | 11/2021 | Celia | .................. | G05B 23/0289 |
| 11,195,057 B2* | 12/2021 | Zadeh | .................. | G06K 9/6264 |
| 2018/0307899 A1 | 10/2018 | Das et al. | | |

OTHER PUBLICATIONS

Yu et al., "Privacy Protecting Visual Processing for Secure Video Surveillance," 15$^{th}$ IEEE International Conference on Image Processing: ICIP 2008, Oct. 12, 2008, pp. 1672-1675 XP031374341 (four (4) pages).

Agrawal et al., "Person De-identification in Videos," Computer Vision—ACCV 2009, Sep. 23, 2009, pp. 266-276, XP019141215 (11 pages).

Gross et al., "Integrating Utility into Face De-identification," Big Data Analytics in the Social and Ubiquitous Context: 5$^{th}$ International Workshop on Modeling Social Media MSM 2014, 5$^{th}$ International Workshop on Mining Ubiquitous and Social Environments, Muse 2014 and First International Workshop on Machine LE, May 30, 2005, pp. 227-242, XP047397096 (16 pages).

Japanese-language Office Action issued in Japanese Application No. 2019-103698 dated Oct. 18, 2022 with English translation (six (6) pages).

* cited by examiner

IMAGE ACCESS MANAGEMENT DEVICE, IMAGE ACCESS MANAGEMENT METHOD, AND IMAGE ACCESS MANAGEMENT SYSTEM

CROSS-REFERENCE TO RELATED APPLICATIONS

The present application claims priority to Japanese Patent Application No. 2019-103698, filed Jun. 3, 2019. The contents of this application are incorporated herein by reference in their entirety.

BACKGROUND OF THE INVENTION

1. Field of the Invention

The present invention relates to an image access management device, an image access management method, and an image access management system.

2. Description of Related Art

In recent years, with the progress of IT, a large number of sensors have been arranged in society and an extremely large amount of data has been accumulated. In this situation, various measures utilizing integrated image data are being studied. In particular, as the number of video contents such as photographs, moving images, and images increases, a large number of means have been developed to accurately specify the identity of a person who appears in the video.

Among the means, a method using machine learning for extracting features of an object in an image and specifying an individual based on the features is known.

For example, US2018/0307899A1 describes a technology for "extracting body features based on one or a plurality of parts of a body, comparing the extracted body features with a feature vector stored in a database, and constructing a classification model for facilitating personal authentication or re-identification based on the extracted body features over a period of time in addition to face authentication".

US2018/0307899A1 describes that, by extracting the features of the body parts (arms, legs, and torso) of a person who appears in the video, and by training a machine learning system using the features, the classification model for specifying the person is constructed. According to the invention described in US2018/0307899A1, for example, even in a case of a video in which the face of a person is not reflected, the identity of the person can be accurately specified.

Meanwhile, from the viewpoint of protection of personal information, it is also required to appropriately protect information that has accurately specified the identity, from unauthorized access.

However, although US2018/0307899A1 describes that an individual is specified based on the body parts of a human, it is not considered to appropriately mange information on the analyzed image data and provide an appropriate access right holder with appropriate range of information.

SUMMARY OF THE INVENTION

Here, an object of the invention is to provide an appropriate access right holder with an appropriate range of information by appropriately changing information amount (dimension) of the features of the video based on the access authority of the access requester.

In order to solve the above-described problem, there is provided an image access management device, which is a representative example of the invention, for managing access to an image, the device including: a feature calculation unit; an access management unit; and an image generation unit, in which the feature calculation unit extracts a feature vector related to a predetermined region in a target image, in a case where the image access management device receives an access request to the target image, the access management unit determines a browsing level with respect to the target image according to an access authority or purpose included in the access request to the target image, and the image generation unit generates a final image that corresponds to the access authority by processing the feature vector according to the browsing level, and provides the generated final image as a response to the access request.

According to the invention, it is possible to provide an appropriate access right holder with an appropriate range of information by appropriately changing information amount (dimension) of the features of the video based on the access authority of the access requester.

The problems, configurations, and effects other than those described above will be apparent from the following description of the embodiments.

DESCRIPTION OF EMBODIMENTS

Figure 1:
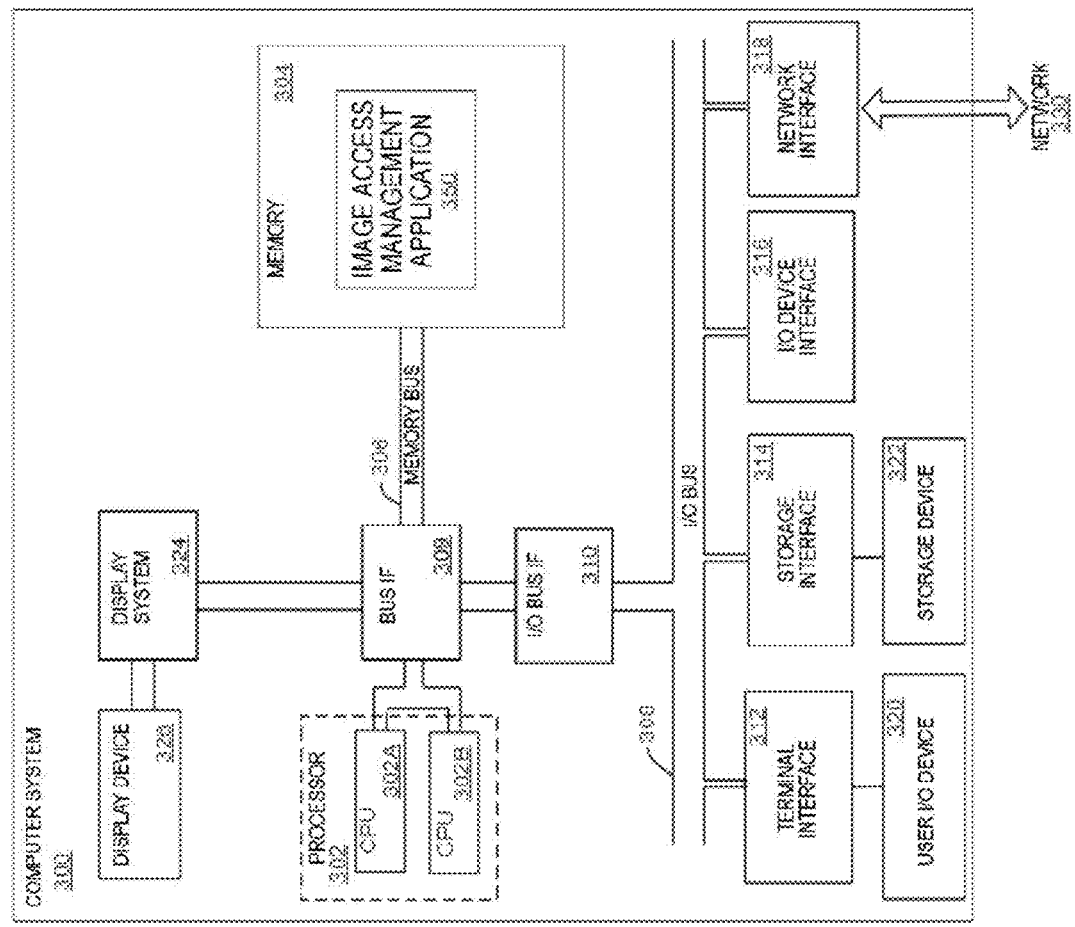
FIG. 1 is a block diagram of a computer system for implementing an embodiment of the invention.

Hereinafter, embodiments of the present invention will be described in detail with reference to the drawings. The invention is not limited by the embodiments. In the description of the drawings, the same parts will be given the same reference numerals.

(Hardware Configuration)

First, a computer system 300 for implementing the embodiments of the disclosure will be described with reference to FIG. 1. The mechanisms and devices of the various embodiments disclosed in the specification may be applied to any appropriate computing system. Main components of the computer system 300 include one or more processors 302, a memory 304, a terminal interface 312, a storage interface 314, an I/O (input/output) device interface 316, and a network interface 318. The components may be connected to each other via a memory bus 306, an I/O bus 308, a bus interface unit 309, and an I/O bus interface unit 310.

The computer system 300 may include one or a plurality of general-purpose programmable central processing units (CPUs) 302A and 302B, collectively referred to as the processor 302. In some embodiments, the computer system 300 may include the plurality of processors, and in other embodiments, the computer system 300 may be a single CPU system. Each processor 302 executes commands stored in the memory 304 and may include an on-board cache.

In some embodiments, the memory 304 may include a random access semiconductor memory, a storage device, or a storage medium (either volatile or non-volatile) for storing data and programs. The memory 304 may store all or some of the programs, modules, and data structures that execute the functions described in the specification. For example, the memory 304 may store an image access management application 350. In some embodiments, the image access management application 350 may include commands or data other than that described above for executing the functions (which will be described later) on the processor 302.

In some embodiments, the image access management application 350 may be used instead of a processor-based system or in addition to a processor-based system, and may be implemented by hardware via a semiconductor device, a chip, a logic gate, a circuit, a circuit card, and/or other physical hardware devices. In some embodiments, an image access management application 350 may include commands and data other than that described above. In some embodiments, a camera, a sensor, or other data input devices (not illustrated) may be provided to communicate directly with the bus interface unit 309, the processor 302, or other hardware of the computer system 300.

The computer system 300 may include the bus interface unit 309 that communicates with the processor 302, the memory 304, a display system 324, and the I/O bus interface unit 310. The I/O bus interface unit 310 may be connected to the I/O bus 308 for transferring data between various I/O units. The I/O bus interface unit 310 includes, via an I/O bus 308, the plurality of I/O interface units 312, 314, 316, and 318 which are also known as an I/O processor (IOP) or I/O adapter (IOA) 318.

The display system 324 may include a display controller, a display memory, or both the controller and the display memory. The display controller can provide video, audio, or data of both the video and data to a display device 326. The computer system 300 may also include one or a plurality of sensors and other devices configured to collect the data and provide the collected data to the processor 302.

For example, the computer system 300 includes: a biometric sensor that collects heart rate data, stress level data, and the like; an environmental sensor that collects humidity data, temperature data, pressure data, and the like; and a motion sensor that collects acceleration data, exercise data, and the like. Other types of sensors can also be used. The display system 324 may be connected to the display device 326 such as an independent display screen, a television, a tablet, or a portable device.

The I/O interface unit has a function of communicating with various storages or I/O devices. For example, the terminal interface unit 312 can install therein a user I/O device 320, such as a user output device such as a video display device or a speaker television, or a user input device such as a keyboard, a mouse, a keypad, a touchpad, a trackball, a button, a light pen, or other pointing device. By operating the user input device using the user interface, the user may input data or instructions into the user I/O device 320 and the computer system 300 and receive output data from the computer system 300. The user interface may be displayed on a display device, reproduced by a speaker, or printed via a printer, for example, via the user I/O device 320.

The storage interface 314 can install therein one or a plurality of disk drives or a direct access storage device 322 (usually a magnetic disk drive storage device, but an array of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path such that the computer system 300 and other devices can communicate with each other. The communication path may be, for example, a network 330.

In one embodiment, the computer system 300 may be a device that receives requests from other computer systems (clients) that do not have a direct user interface, such as a multi-user mainframe computer system, a single-user system, or a server computer. In other embodiments, the computer system 300 may be a desktop computer, a portable computer, a laptop, a tablet computer, a pocket computer, a telephone, a smartphone, or any other appropriate electronic device.

Figure 2:
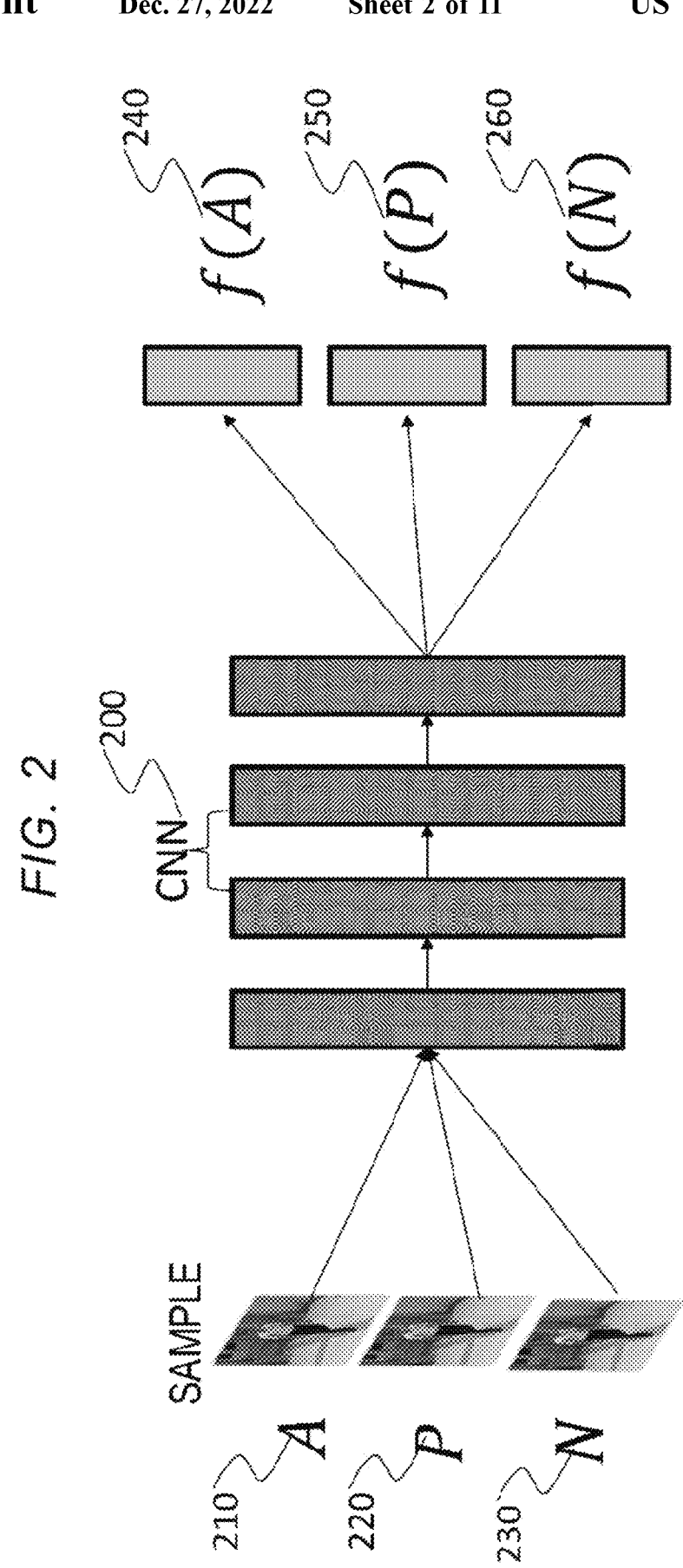
FIG. 2 is a diagram illustrating Semantic Triplet Loss by a neural network in image access management according to the invention.

Next, FIG. 2 is a diagram illustrating Semantic Triplet Loss by a neural network 200 in image access management according to the invention.

Aspects of embodiments of the disclosure are related to the neural network. Generally, the "neural network" is a calculation model having functions such as machine learning and pattern recognition. The neural network may be applied to various operating environments such as local devices, server/client configurations, distributed networks, and the like, and may be trained in various training methods.

The neural network 200 according to the invention may be, for example, a convolutional neural network (CNN) trained by a training method called Semantic Triplet Loss. Hereinafter, Semantic Triple Loss will be described.

In Semantic Triplet Loss training, first, a reference anchor class is set, and one representative sample (sample A210) is selected from the anchor class. The sample A210 may be, for example, an image or a video. Thereafter, another sample (sample P220) is selected from the same anchor class. Then, another sample N230 is selected from a class different from that of the sample A210. Here, the sample P220 is a positive sample with respect to the sample A210, and the sample N230 is a negative sample with respect to the sample A210.

After the sample A210, the sample P220, and the sample N230 are selected, the neural network 200 uses existing means of feature calculation to calculate features f(A)240, f(P)250, and f(N)260 that correspond to the samples. Then, based on the features f(A)240, f(P)250, and f(N)260, the neural network 200 calculates the respective distances d(f (A), f(P)), and d(f(A), f(N)) (not illustrated). The distance may be, for example, an L2 norm of the feature in the Euclidean space, but may be a norm of another space.

Next, the neural network 200 calculates semantic similarity of each of the sample A210, the sample P220, and the sample N230 based on the class of each of the selected samples. The semantic similarity may be calculated based on a tool, such as Wordnet, where the words are connected to each other in a correlated manner in a graph structure. In the Wordnet, each word in a certain language is expressed as a node, and each node is positioned at a distance proportional to the similarity to another node (that is, a node that corresponds to a word having a high similarity is positioned to be close, and a node that corresponds to a word having a low similarity is positioned to be far). The semantic similarity of each sample is calculated, for example, based on the distance on Wordnet. The semantic similarity may be calculated by means other than Wordnet.

Next, the neural network 200 confirms whether or not the distances d (f(A), f(P)) and d (f(A), f(N)) are proportional to semantic similarity s(A, N) of each sample. In order to perform the confirmation, the neural network 200 uses one or more expressions among the following expressions 1 to 4. The expression to be applied may be appropriately selected based on, for example, the classification accuracy of the target of the neural network to be trained.

$$d(f(A), f(P)) < t \qquad \text{[Expression 1]}$$

In Expression 1, it is guaranteed that the distance d(f(A), f(P)) between the sample A210 of the anchor class and the positive sample P220 is less than a predetermined threshold value t. The predetermined threshold value t may be determined based on, for example, the dimension of the feature f.

$$d(f(A), f(N)) > t \qquad \text{[Expression 2]}$$

In Expression 2, it is guaranteed that the distance d(f(A), f(N)) between the sample A210 of the anchor class and the negative sample P230 is greater than the predetermined threshold value t.

$$(f(A), f(N)) < t + k \cdot s(A, N) \qquad \text{[Equation 3]}$$

In Expression 3, it is guaranteed that the distance d(f(A), f(N)) between the sample A210 of the anchor class and the negative sample N230 is less than the sum of the predetermined threshold value t and the semantic similarity s (A, N) of the sample A210 of the anchor class and the negative sample N230. Here, "k" is a scaling coefficient based on the dimension of a vector space of the feature f.

$$(f(A), f(N)) > t + 1 \cdot s(A, N) \qquad \text{[Expression 4]}$$

In Expression 4, it is guaranteed that the distance d(f(A), f(N)) between the sample A210 of the anchor class and the negative sample N230 is greater than the sum of the predetermined threshold value t and the semantic similarity s (A, N) of the sample A210 of the anchor class and the negative sample N230.

In a case where any of the features f(A), f(P), and f(N) do not satisfy the condition defined by the applied expression, the result is provided to the neural network as feedback. By repeating the processing, the classification accuracy of the neural network is improved, and learning can be performed to detect a class having a semantic relationship.

The neural network trained in this manner can appropriately adjust the dimension of the feature vector by performing "semantic operation" with respect to the attribute values of the feature vector that corresponds to the input image. Here, the "semantic operation" is a calculation based on semantic elements such as person, concept, situation, purpose, action, statement, and reason which are indicated in the input data. For example, an image indicating "king" can be obtained by performing a semantic addition with respect to an image indicating "man" and an image indicating "crown". For example, an image indicating "horse" can be obtained by performing a semantic subtraction with respect to an image indicating "unicorn" and an image indicating "angle".

By using the above-described neural network trained by Semantic Triplet Loss described above, each embodiment of the invention described below can be implemented.

Figure 3:
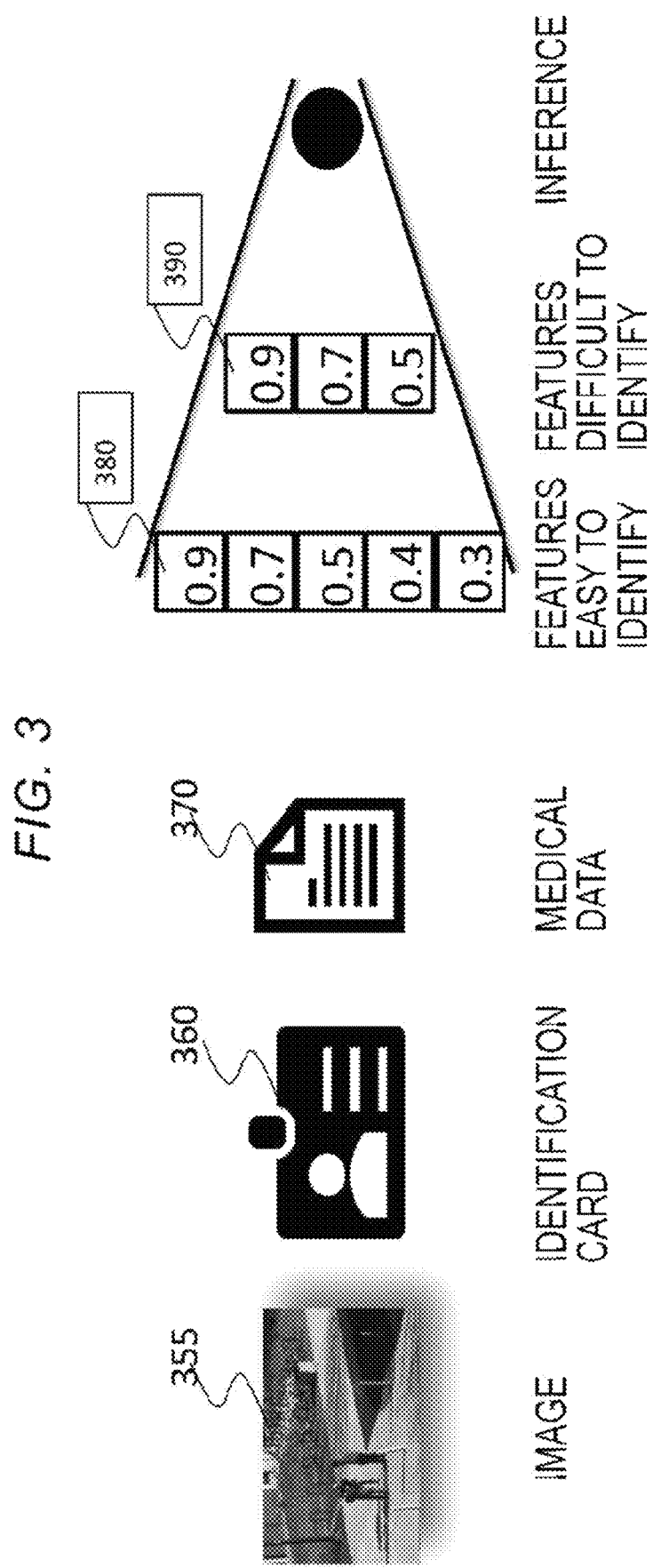
FIG. 3 is a conceptual diagram of dimension reduction of information in the image access management according to the invention.

Next, the concept of dimension reduction of information in the image access management according to the invention will be described with reference to FIG. 3.

There is a case where data acquired by a large number of sensors in society includes "personal identification information" that can specify the identity of an individual. As illustrated in FIG. 3, examples of such personal identification information include video data 355 collected by a surveillance camera, an identification card 360 such as a driver's license or a passport, medical data 370 indicating the diagnostics result at a medical institution, or the like.

In the personal identification information, an amount of included information varies depending on the format, content, resolution, and the like of the information. One measure that represents the amount of information is the "dimension" of information. Here, the dimension of information means the number of variables included in certain information. The variable is an attribute used for deriving a meaningful inference related to the information. For example, in a case of an image that represents a situation in which a plurality of people are talking, the number of people in the conversation, outfit (type, color, brand), gender, age, location, surrounding environment, and the like, are attributes for deriving the inferences related to the meaning indicated by the image.

The attributes may be represented as numerical values. In the specification, a digitized attribute is called an "attribute value". One or more attribute values that represent the attributes of a region or an object in a certain image are referred to as "feature vectors". The feature vector is defined by the number of included attribute values. For example, the dimension of a feature vector 380 illustrated in FIG. 3 is "5", and the dimension of a feature vector 390 is "3".

The inference that can be derived differs depending on the dimension of the feature vector. In principle, the higher the dimension of the feature vector is, the easier the derivation of the inferences related to finer elements of the image is. For example, with a feature vector 380 having a high dimension, which includes an attribute related to the face of a person who appears in an image, there is a high possibility that it is possible to derive an inference related to specifying the identity of the person who appears in the image. Meanwhile, with the feature vector 390 having a lower dimension, which does not include an attribute related to the face of a person who appears in an image, there is a high possibility that it is possible to derive an inference related to specifying the identity of the person who appears in the image. Therefore, by appropriately adjusting the dimension of the feature vector by the neural network according to the invention, it is possible to manage the inference that can be derived from the feature vector.

With the strict handling of personal information, it is required to appropriately protect confidential information included in the stored data. Therefore, the invention can provide an appropriate access right holder with an appropriate range of information by adjusting the dimension of the information.

Next, a concept of information access grant in the image access management according to the invention will be described with reference to FIG. 4.

As described above, the invention relates to providing an appropriate range of information by adjusting the feature vector of the image based on an access authority of an access requester. Hereinafter, an example of granting access to an appropriate range of information based on the access authority of the access requester will be described.

Figure 4:
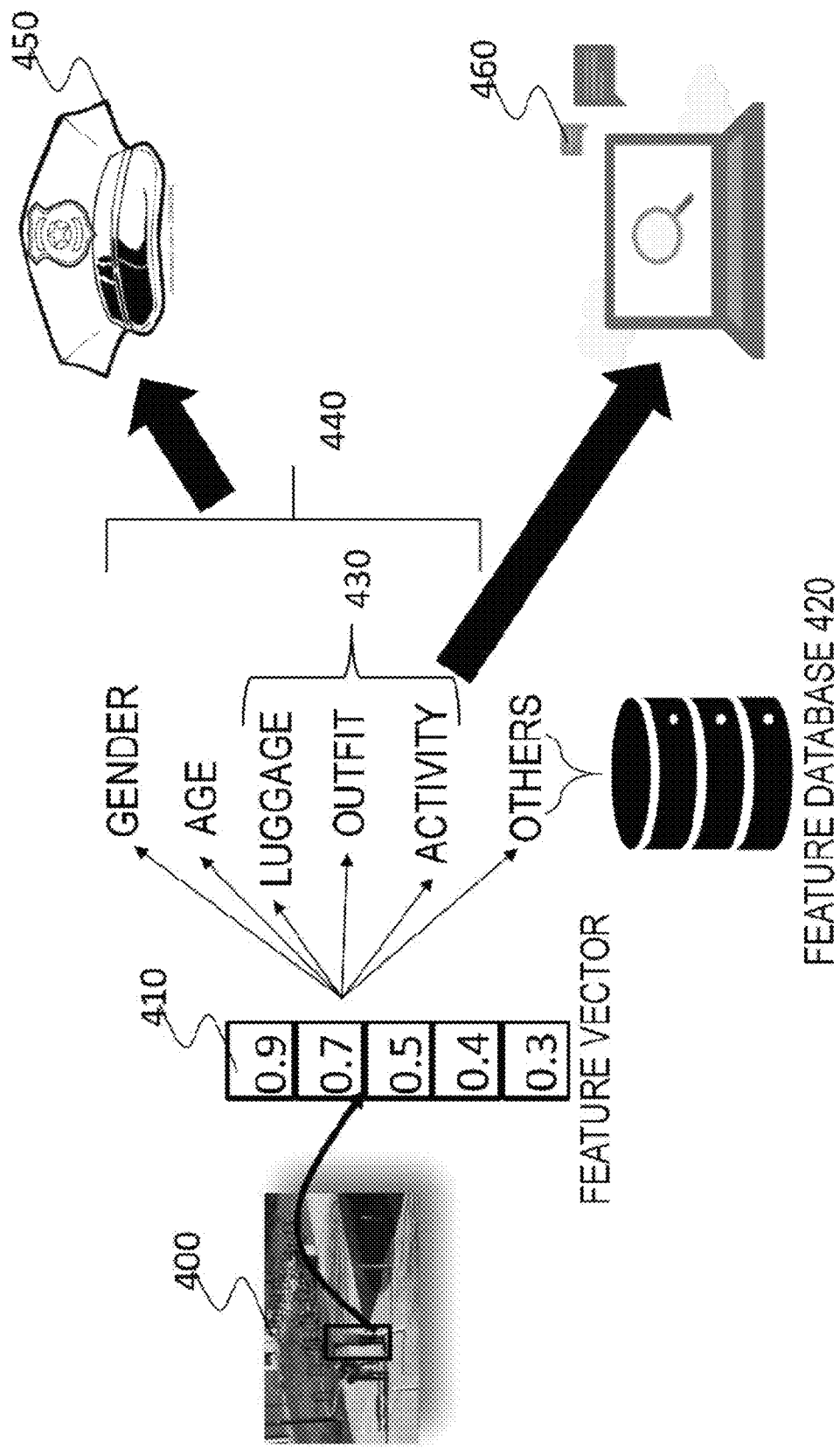
FIG. 4 is a diagram illustrating a concept of information access grant in the image access management according to the invention.

As illustrated in FIG. 4, the above-described neural network (not illustrated) calculates a feature vector 410 related to a target image. As described above, the feature vector includes the attribute value that represents the attribute of the region or the object in the target image. For example, in a case where the target image indicates that a plurality of people are having a conversation, the feature vector 410 may include attributes indicating gender, age, luggage, outfit, and activity of the people who appear in the image.

After the feature vector 410 related to the target image is calculated, the feature vector 410 is stored in a feature database 420. The details of the feature database 420 will be described later.

Thereafter, in a case where there is a request from the access requester, the access management unit (which will be described later) determines a browsing level for the target image according to the access authority or purpose included in the access request of the access requester. The determination may be made based on a preset criterion. For example, for the government agencies such as police stations, fire departments, and the Ministry of Defense, the browsing level that grants the access in a wide range is determined, and for the request from the non-governmental organizations such as private companies, hospitals, and banks, the browsing level that grants the access only to the limited information may be determined.

Subsequently, the image generation unit (which will be described later) processes the feature vector 410 stored in the feature database 420 according to the browsing level determined based on the access authority of the access requester, to generate a final image that corresponds to the access authority of the access requester, and to provide the generated final image as a response to the access request.

As an example, for a police station 450, a high browsing level is determined, and for a private company 460, an access to limited information is determined. As illustrated in FIG. 4, in a case where there is an access request from the police station 450, a high browsing level is determined for the police station 450, and thus, a final image including all the attributes 440 of the feature vector 410 is generated, and the generated final image is provided as a response to an access request.

Meanwhile, in a case where there is a request from the private company 460 such as a marketing company, an access to the limited information is determined for the private company 460, and thus, a final image including only the specific attribute 430 (for example, an attribute difficult to identify the identity of an individual) of the feature vector 410 is generated, and the generated final image is provided as a response to the access request.

Accordingly, it is possible to protect the confidential information from an unauthorized access and provide an appropriate access right holder with an appropriate range of information.

Details of processing such as determination of browsing level, processing of feature vector, and generation of a final image will be described later.

Next, an example of a configuration of an image access management system 500 according to the invention will be described with reference to FIG. 5.

Figure 5:
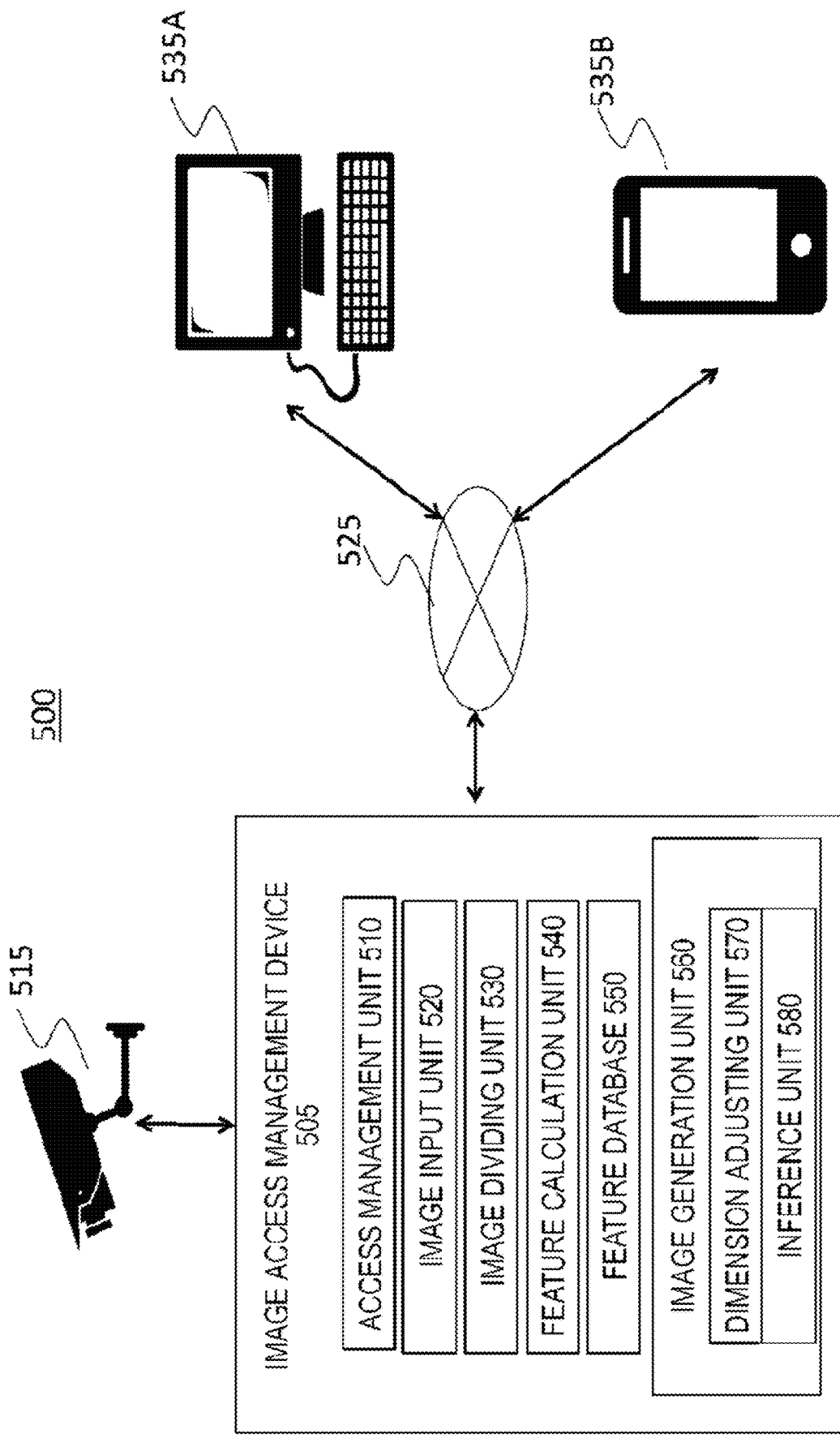
FIG. 5 is a block diagram illustrating an example of a configuration of an image access management system according to the invention.
Figure 6:
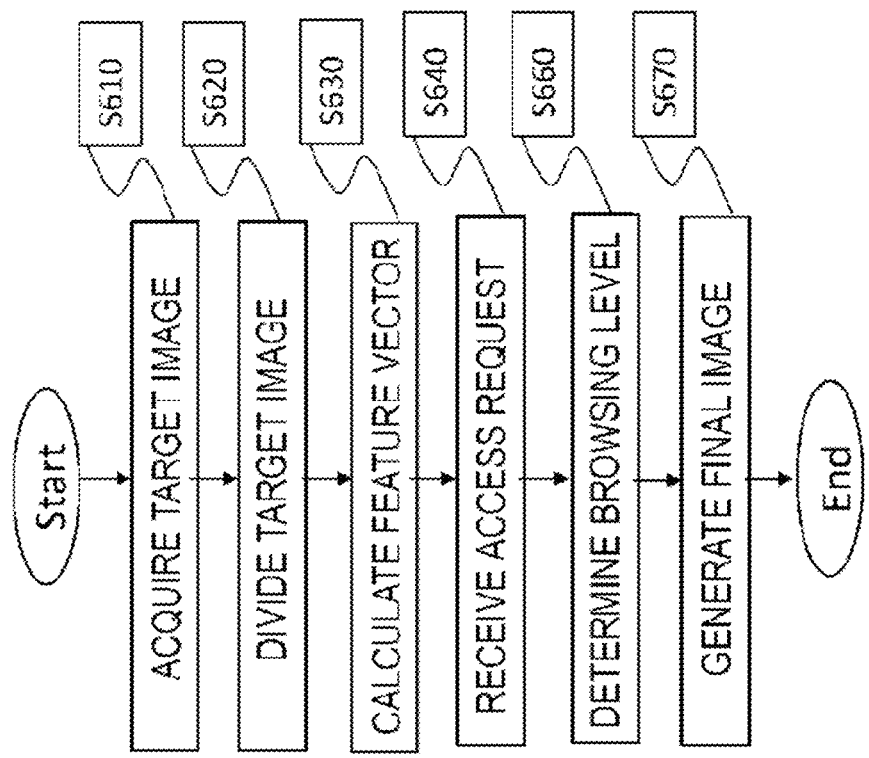
FIG. 6 is a flowchart illustrating an example of processing of the image access management according to the invention.

As illustrated in FIG. 5, the image access management system 500 includes an image access device 505, a sensor 515, a network 525, and client terminals 535A and 535B. The image access device 505 is connected to the client terminals 535A and 535B via the network 525. The image access management device 505 is directly connected to the sensor 515.

The image access management device 505 includes: an access management unit 510 that manages access to the target image; an image input unit 520 that receives input of the target image; an image dividing unit 530 that divides the target image; a feature calculation unit 540 that calculates a feature vector that corresponds to the target image; a feature database 550 that stores the feature vector calculated based on a target image; an image generation unit 560 that generates an image according to the access authority of an access requester; a dimension adjusting unit 570 that adjusts a dimension of the feature vector; and an inference unit 580 that derives an inference from the generated image.

Each functional unit included in the image access management device 505 may be a software module that configures the image access management application 350 illustrated in FIG. 1, or may be an independent dedicated hardware device. The above-described functional units may be implemented in the same computing environment, or may be implemented in a distributed computing environment. For example, the image generation unit 560 and the feature calculation unit 540 may be mounted on a remote server, and the other functional units may be mounted on local devices such as the client terminals 535A and 535B.

The sensor 515 is a device that acquires information on mechanical, electromagnetic, thermal, acoustic, and chemical properties of a natural phenomenon or an artificial object, and replaces the information with a signal of another medium that can be easily handled by a human or a machine. The sensor 515 may be any sensor such as a monitoring camera, a recording device, an optical sensor, an infrared sensor, an ultrasonic range finder, a laser Doppler vibrometer, and the like, but in the specification, a case where the sensor 515 is used as a surveillance camera will be described as an example.

The client terminals 535A and 535B are client terminals that transmit, via the network 525, an access request to the target image stored in the feature database 550 of the image access management device 505. The client terminals 535A and 535B may be terminals used by individuals or terminals in organizations such as police stations and private companies. The client terminals 535A and 535B may be any device such as a desktop personal computer, a laptop, a tablet, and a smartphone.

The details of the functions of the functional units or devices included in the image access management system 500 will be described later.

Next, an example of processing 600 of the image access management according to the invention will be described.

The following processing is processing for providing an appropriate access right holder with an appropriate range of information by appropriately changing the information amount (dimension) of the feature of the video based on the access authority of the access requester, and is implemented by devices or functional units included in the image access management system 500, for example, illustrated in FIG. 5.

First, in step S610, the image input unit (for example, the image input unit 520 illustrated in FIG. 5) acquires a target image. Here, the expression "acquire" includes collecting, obtaining, and taking the target image. The target image may be, for example, a still image such as a photograph acquired from a sensor (for example, the sensor 515 illustrated in FIG. 5) such as a surveillance camera, or may be a video such as a moving image. Thereafter, the image input unit may perform low-level image processing such as noise reduction or blur reduction.

Next, in step S620, the image dividing unit (for example, the image dividing unit 530 illustrated in FIG. 5) divides the acquired target image into a plurality of regions. Here, the expression "divide" includes defining, partitioning, and grouping the target image into a plurality of regions. In the image division processing, the target image may be divided into a grid-like region having an equal size, for example, as a target image 710 in FIG. 7 (which will be described later).

Hereinafter, each cell in the grid-like region is referred to as a "patch". The size of the patch may be appropriately determined according to the number of pixels or the complexity of the target image. For example, in a case where the number of pixels or the complexity of the target image is high, it is desirable to divide the target image into fine patches having a smaller area. This is because, as the patch becomes smaller, a feature vector that represents the attribute of the object included in the patch in a higher dimension can be generated.

Next, in step S630, the feature calculation unit (for example, the feature calculation unit 540 illustrated in FIG. 5) calculates a feature vector related to a region including one or more patches in the target image. Here, the expression "calculate" includes computing, indexing, predicting, and deriving a feature vector.

Specifically, the feature calculation unit calculates feature values related to each patch in the divided target image, and processes the calculated feature values with the neural network such as CNN to generate one or more feature maps that correspond to the target image. Thereafter, the feature calculation unit extracts a predetermined element (for example, one object or the like) in the feature map as a feature vector. As described above, the feature vector is a vector obtained from the attribute value that represents the attribute of the object in the target image. In other words, the feature vector is a set of values that correspond to specific coordinates in a plurality of feature maps.

Then, the feature calculation unit stores the extracted feature vector in a feature database (for example, the feature database 550 illustrated in FIG. 5). The feature database is, for example, a database that stores the feature data calculated from a large number of images in a searchable format. The feature database 420 may be, for example, a relational database management system (RDBMS) that uses a domain-specific language such as SQL.

Next, in step S640, the access management unit (for example, the feature database 550 illustrated in FIG. 5) receives an access request to the target image. Here, the expression "receive" includes receiving, embracing, getting, admitting, being given, and acquiring an access request. The access request may be, for example, an access request from a government agency such as police stations, fire departments, the Ministry of Defense, non-governmental organizations such as private companies, hospitals or banks, or an individual. The access request includes, for example, an identifier for designating an image to be accessed, a purpose of accessing the image, and an access authority for verifying the request of the access requester. The access request may be input, for example, via the client terminals 535A and 535B in FIG. 5.

Next, in step S650, the access management unit determines the browsing level of the access requester of the received access request. Here, "determine" includes concluding, selecting, deciding, settling, sorting, calculating, or judging the browsing level. The browsing level defines a range in which a certain access requester can browse the target image.

The browsing level is expressed by, for example, three numbers such as "1" indicating a high browsing range, "2" indicating a medium browsing range, and "3" indicating a low browsing range. It is illustrated that browsing, in which the higher the browsing level is (that is, closer to 1), the higher the dimension of the information included in the target image is, is permitted. For example, in a case where the browsing level is "1", it is possible to browse an image including an attribute easy to identify the identity of an individual, such as gender or age of a person who appears in the target image. Meanwhile, in a case where the browsing level is "2", it is possible to browse an image including an attribute more difficult to identify the identity of an individual, such as activity or outfit of a person who appears in the target image.

The access management unit may determine the browsing level of the access requester, for example, by comparing the access authority included in the access request with an access management table created in advance. The access management table may be, for example, a database that determines an appropriate browsing level of the access requester for each type of access requester (individual, government agency, private company, and the like) or for each browsing purpose (crime prevention, marketing research, and the like). For example, in a case where the access authority included in the access request indicates that the access requester is a police station and the browsing purpose is crime prevention, the access management unit may determine that the browsing level "1" for granting a high browsing range may be determined with reference to the access management table.

Next, in step S670, the image generation unit (for example, the image generation unit 560 illustrated in FIG. 5) processes the target image according to the determined browsing level to generate the final image that corresponds to the access authority of the access requester. Here, the expression "generate" includes creating, making, inventing, and constructing a final image. The image generating means described here includes two steps including a step of reducing the calculated feature vector and a step of deriving an inference based on the reduced feature vector, but the invention is not limited thereto. For example, it is also possible to generate an image without the step of deriving the inference or to generate an image with more steps.

First, the dimension adjusting unit (for example, the dimension adjusting unit 570 illustrated in FIG. 5) of the image generation unit adjusts (for example, reduces) the dimension of the feature vector that corresponds to the target image and is stored in the feature database using a method which will be described later. Here, the expression "adjust" includes reducing or increasing a feature vector, but hereinafter, an example of performing processing for reducing the feature vector will be described.

As will be described later, there are a plurality of means for adjusting the feature vector, and which means to apply may be selected based on the determined browsing level. For example, in a case where the browsing level is determined to be "3", the dimension adjusting unit may adjust the dimension of the feature vector such that an attribute easy to identify the identity of an individual is excluded or blurred. Meanwhile, in a case where the browsing level is determined to be "1", the dimension adjusting unit may generate the target image as it is as a final image without adjusting the dimension of the feature vector of the target image.

Figure 8:
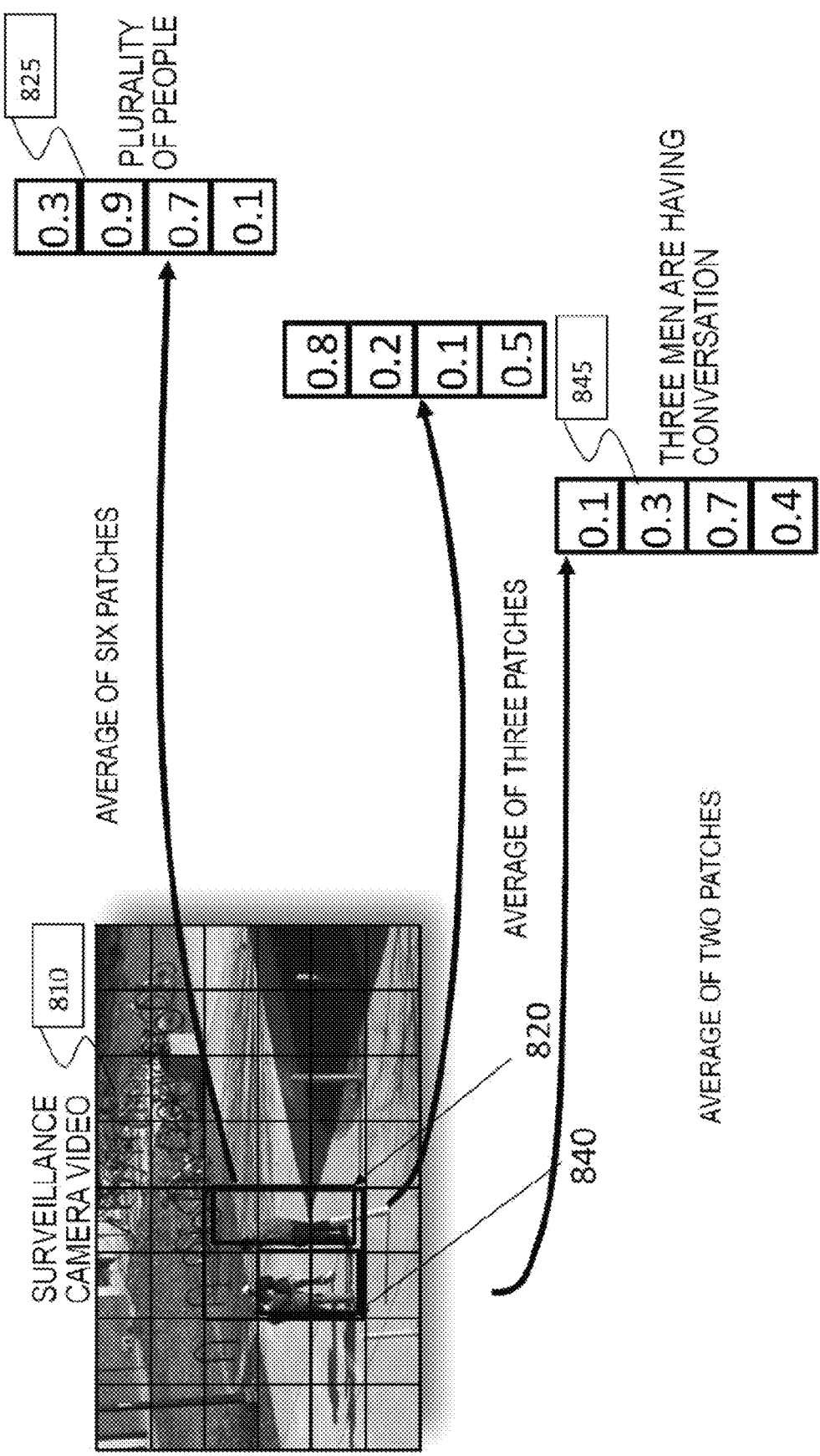
FIG. 8 is a diagram illustrating an example of dimension reduction of a feature vector by semantic combination of features in the image access management according to the invention.
Figure 9:
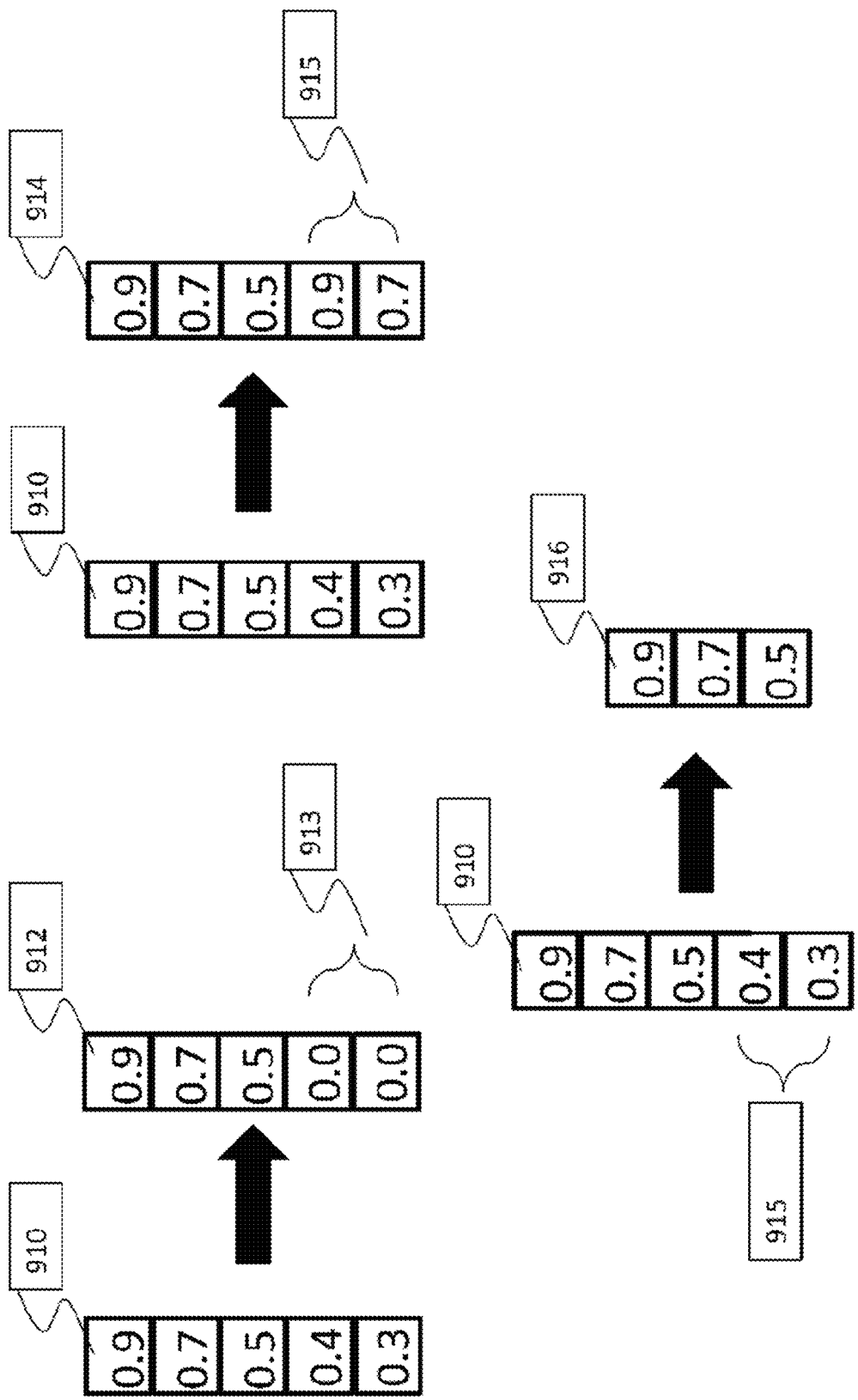
FIG. 9 is a diagram illustrating an example of dimension reduction of a feature vector by changing attribute values in the image access management according to the invention.
Figure 10:
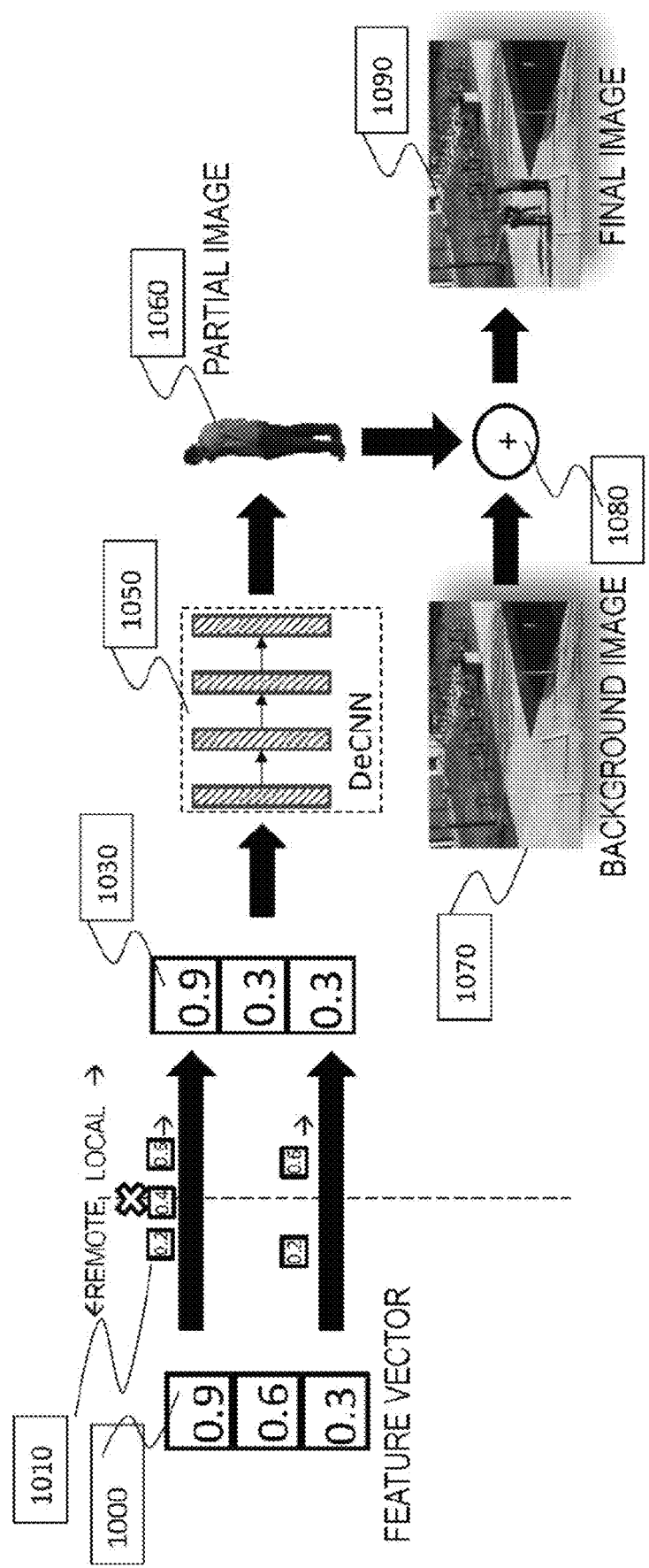
FIG. 10 is a diagram illustrating an example of dimension reduction of a feature vector due to a constraint of a communication network in the image access management according to the invention.

The means for the dimension reduction of the feature vector will be described with reference to FIGS. 8 to 10.

After the dimension of the feature vector is adjusted, the inference unit (for example, the inference unit 580 illustrated in FIG. 5) of the image generation unit derives an inference related to the feature vector having the reduced dimension. Here, the expression "deriving an inference" means extracting information that can be interpreted by a human from matters related to person, concept, situation, purpose, action, remark, reason, and the like, indicated by attributes included in the target vector. For example, in a case where the target image is an image that represents a situation in which a plurality of people are having a conversation, the inference unit derives an inference related to gender, outfit, activity, location, size, color, and type of the object that appears in the target image based on the feature vector.

The accuracy of the above-described inference differs depending on the dimension of the target feature vector. The higher the dimension of the feature vector is, the more specific the derivation of inference related to the object that appears in the target image is. Meanwhile, the lower the feature vector is, the lower the accuracy of the inference related to the object that appears in the target image is. In the invention, the range of information provided to the access requester can be limited by utilizing the reduction in accuracy.

After the inference is derived, the image generation unit generates a final image by using the feature vector having the adjusted dimension and the information on the inference derived based on the feature vector. Since the final image is an image generated based on the feature vector having the reduced dimension according to the browsing level determined for the access requester, only an appropriate range of information is provided to the access requester. Thereafter, the image access management device provides the final image to the access requester as a response to the request.

According to the above-described processing, it is possible to protect the confidential information from an unauthorized access and provide an appropriate access right holder with an appropriate range of information.

Figure 7:
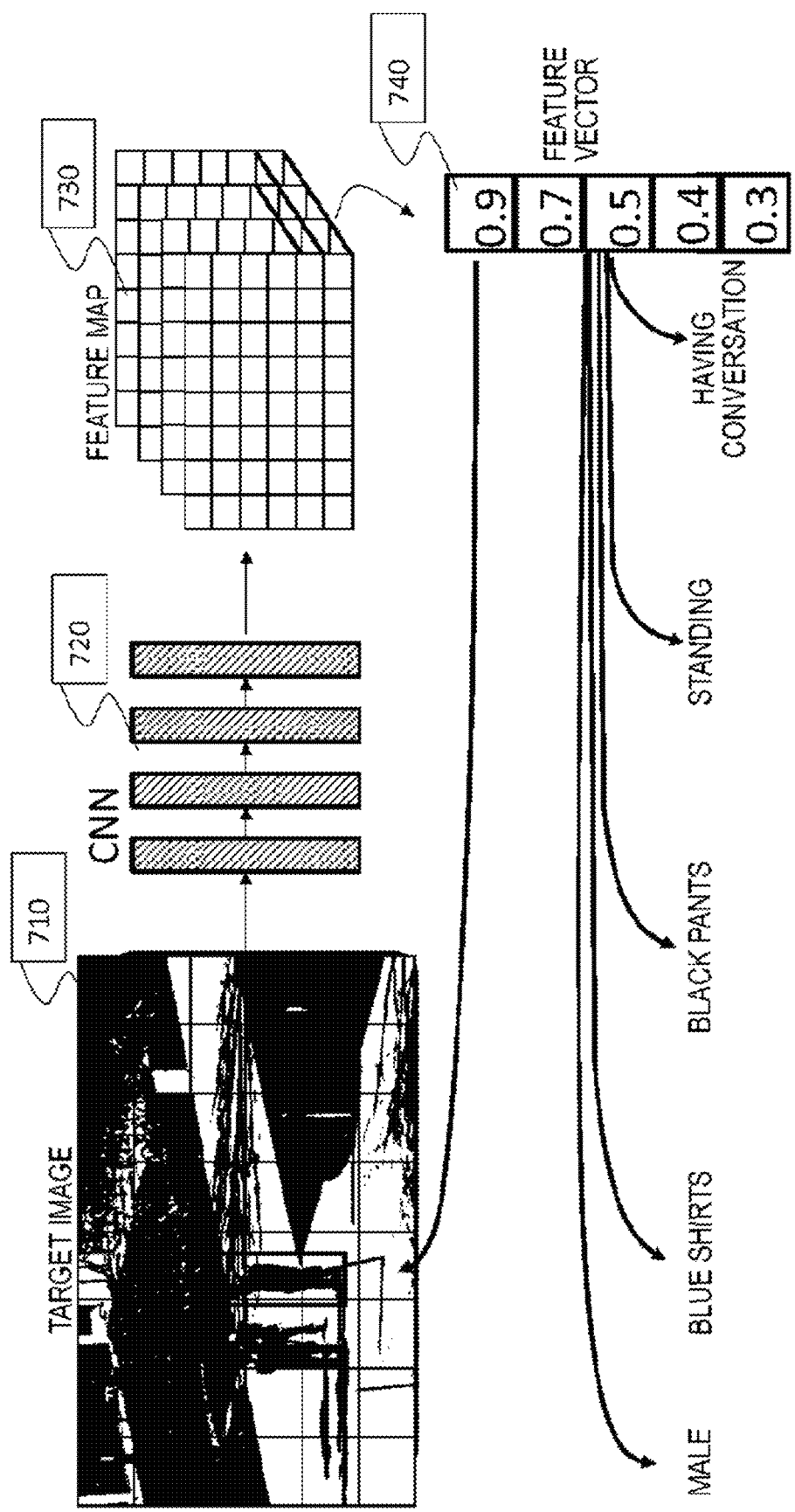
FIG. 7 is a diagram illustrating an example of calculation of a feature vector by the neural network in the image access management according to the invention.

Next, an example of calculation of a feature vector 740 by a neural network 720 in the image access management according to the invention will be described with reference to FIG. 7.

It is assumed that the target image 710 that represents a situation in which a plurality of people are having a conversation is acquired from a surveillance camera (for example, the sensor 515 illustrated in FIG. 5). The image dividing unit (for example, the image dividing unit 530 illustrated in FIG. 5) divides the target image 710 into patches having an equal area, as illustrated in FIG. 7.

Then, the feature calculation unit (for example, the feature calculation unit 540 illustrated in FIG. 5) calculates feature values related to each of the patches in the divided target images, and processes the calculated feature values with the neural network 720 such as CNN to generate one or more feature maps 730 that correspond to the target image. Thereafter, the feature calculation unit extracts a value of the predetermined region (for example, one or more patches) in the feature map 730 as a feature vector 740.

The feature vector 740 includes a plurality of attribute values that represent the attribute of the predetermined region in the target image. For example, as illustrated in FIG. 7, in a case where a male who wears blue shirts and black pants and standing and talking appears in the predetermined region, the attribute values that represent each of the attributes are included in the feature vector 740.

Although the feature vector including five attribute values has been described as an example, the invention is not limited thereto, and the number of attribute values of the feature vector may be set to any value depending on the complexity of the object that appears in the predetermined region.

Next, the means for adjusting (reducing) the dimension of the feature vector according to the invention will be described with reference to FIGS. 8 to 10.

The dimension reduction of the feature vector by semantic combination of the features in the image access management according to the invention will be described with reference to FIG. 8.

As described above, in the invention, in order to provide the appropriate access right holder with an appropriate range of information, the dimension adjusting unit (for example, the dimension adjusting unit 570 illustrated in FIG. 5) performs processing of reducing the dimension of the feature vector calculated from the target image. In one method of the dimension reduction, the dimension adjusting unit generates a feature vector having the reduced dimension by calculating the semantic average of the plurality of feature vectors that correspond to different regions (patches) in the target image. Hereinafter, an example of the means for the dimension reduction will be described.

First, the above-described feature calculation unit (for example, the feature calculation unit 540 illustrated in FIG. 5) calculates a first feature vector related to a first patch and calculates a second feature vector related to a second patch in a target image 810. The calculation of the feature vector may be calculated by, for example, means for calculating the feature vector, for example, illustrated in FIG. 7.

The first patch and the second patch may be any patch, but are preferably patches that are relatively close (for example, within a predetermined distance threshold value) in the target image. This is because the closer the patches in the target image are to each other, the higher the probability of being related to the common attribute is, and the feature vector that can derive a more meaningful inference can be obtained.

Thereafter, the dimension adjusting unit (for example, the dimension adjusting unit 570 illustrated in FIG. 5) calculates a semantic average of the first feature vector and the second feature vector. The semantic average may be calculated by, for example, the semantic operation of the CNN trained by the above-described Semantic Triplet Loss training method.

By calculating the semantic average of the plurality of feature vectors, fine information on the attributes of the feature vectors is lost, and feature vectors (that is, feature vectors having lower dimensions) having more coarse information on the attributes are achieved. In the above, a case where the semantic average of two feature vectors that correspond to two patches is calculated has been described, but the processing may be performed with respect to any number of feature vectors, and the higher the number of feature vectors is, the rougher (that is, the dimension is lower) information derivable from inference is acquired.

For example, in a case where the semantic average of the feature vectors that correspond to a region 840 including two patches is calculated and the inference related to the calculated feature vector 845 is derived, an inference that clarifies information such as gender, number of people, and activity, that is, "three men are having a conversation" can be derived. Meanwhile, in a case where the semantic average of the feature vectors that correspond to a region 820 including six patches is calculated and the inference related to the calculated feature vector 825 is derived, information on gender or activity, for example "plurality of people" is lost, and an inference related to rougher information is achieved.

In this manner, by calculating the semantic average of the feature vectors that correspond to the plurality of patches in the target image, a feature vector having the reduced dimension, which does not include an attribute easy to identify the identity of an individual can be generated. By using the feature vector having the reduced dimension and the inference related to the feature vector, a final image that provides the access requester only with an appropriate range of information can be generated.

Next, an example of the dimension reduction of the feature vector by changing the attribute values in the image access management according to the invention will be described.

As described above, in the invention, in order to provide the appropriate access right holder with an appropriate range of information, the dimension adjusting unit (for example, the dimension adjusting unit 570 illustrated in FIG. 5) performs processing of reducing the dimension of the feature vector calculated from the target image. In one method of the dimension reduction, the dimension adjusting unit can obtain the feature vector having the reduced dimension by changing a specific attribute value included in the feature vector.

Hereinafter, three means for changing the specific attribute value included in the feature vector will be described, but the invention is not limited to the following means, and the attribute of the feature vector may be changed by other means.

As one of the means for changing the attribute value of the feature vector, "0" can be inserted instead of one or more attribute values of the feature vector. For example, as illustrated in FIG. 9, by replacing the lower two attribute values 913 in the feature vector 910 having five attribute values with "0", a feature vector 912 in which a specific attribute (for example, information easy to identify the identity of an individual, such as gender or age) returns to an initial state can be obtained.

For example, in a case where a person who appears in the target image is having a conversation, by replacing the attribute value that corresponds to the activity of the person with "0", the feature vector including the attribute value indicating that the person who appears is doing nothing is obtained.

As another means for changing the attribute value of the feature vector, there is means for inserting a random value instead of one or more attribute values of the feature vector. For example, as illustrated in FIG. 9, by replacing the lower two attribute values 915 in the feature vector 910 having five attribute values with random values, a feature vector 916 in which a specific attribute is set to a random state can be obtained.

For example, in a case where the color of the outfit of the person who appears in the target image is red, by making the attribute value that corresponds to the color of the outfit is set to a random value, the feature vector having an attribute value indicating that the color of the outfit of the person who appears is a random color (for example, green) is obtained.

As one of the means for changing the attribute value of the feature vector, one or more attribute values of the feature vector can be deleted. For example, as illustrated in FIG. 9, by deleting the lower two attribute values 915 in the feature vector 910 having five attribute values, the feature vector 916 in which a specific attribute is deleted can be obtained.

For example, when a person who appears in the target image has luggage, by deleting the attribute value that corresponds to the luggage, a feature vector including an attribute value indicating a state where the person who appears does not have luggage can be obtained.

As described above, the inference derived for the feature vector having the reduced dimension in this manner is different from the target image, and is rougher. For example, while the inference that "a male wearing blue shirts is talking at coordinates (X1, Y1, X2, Y2)" with respect to the original feature vector has been derived, the inference that can be derived with respect to the feature vector having the reduced dimension is "a male is standing at coordinates (X1, Y1, X2, Y2)" or "a male wearing red shirts is talking at coordinates (X1, Y1, X2, Y2)". In other words, it is conceivable that information is lost or a state different from the target image is displayed. In the invention, the range of information provided to the access requester can be limited by reducing the accuracy.

In this manner, by changing the specific attribute value included in the feature vector, the feature vector having the reduced dimension, which does not have an attribute easy to identify the identity of an individual, can be generated. In other words, by using the feature vector having the reduced dimension and the inference related to the feature vector, a final image that provides the access requester only with an appropriate range of information can be generated.

Next, an example of the dimension reduction of information by a constraint of the communication network in the image access management according to the invention will be described with reference to FIG. 10.

As described above, in the invention, in order to provide the appropriate access right holder with an appropriate range of information, the dimension adjusting unit (for example, the dimension adjusting unit 570 illustrated in FIG. 5) performs processing of reducing the dimension of the feature vector calculated from the target image. In one method of the dimension reduction, the dimension adjusting unit can generate the feature vector having the reduced dimension by using the constraint depending on the communication network such as a WAN, a LAN, or the Internet. Hereinafter, the details of the dimension reduction method will be described.

In a case where the image access management device and the client terminal are connected to each other via a communication network, there is a case where a part of data to be transmitted is lost due to the constraint such as communication network bandwidth, information flow restriction, noise, and firewall. In the invention, the dimension of the feature vector can be reduced by utilizing this data loss.

A case where a feature vector 1000 is transmitted via a communication channel 1010 will be described as an example. It is assumed that the attribute included in the feature vector 1000 is lost due to any constraint such as the bandwidth of the communication channel 1010, the information flow restriction, on the information flow rate, noise, and the firewall. Thereafter, the side that has received the feature vector 1000 of which the attribute is lost (for example, the client terminals 535A and 535B illustrated in FIG. 5) inserts any value instead of the lost attribute. The any value may be, for example, "0", may be a randomly generated value, or may be an average value of remaining attributes.

Next, the side that has received the feature vector 1000 of which the attribute is lost generates a partial image 1060 that corresponds to the attribute of the received feature vector 1000 using a neural network 1050 such as CNN. Since the partial image 1060 is generated based on a feature vector including a "false" attribute value (that is, a value different from the original attribute value), the dimension is reduced compared to the feature vector 1000 before transmission. Thereafter, the final image can be generated by inserting the generated partial image 1060 into a predetermined background image 1070.

Although a case where the dimension of the feature vector is randomly reduced due to the constraint of the communication network has been described above, the invention is not limited thereto. For example, by configuring a communication control unit such as a router or a firewall such that a predetermined amount of noise is imposed on a feature vector or transmission of a data packet that corresponds to a specific attribute is prevented, the dimension of the feature vector can be adjusted (reduced) based on the access authority of the access requester. In the above-described method, since only the feature vector, not the entire target image, is transmitted on the network, an effect of reducing the amount of data to be transmitted can be obtained.

Figure 11:
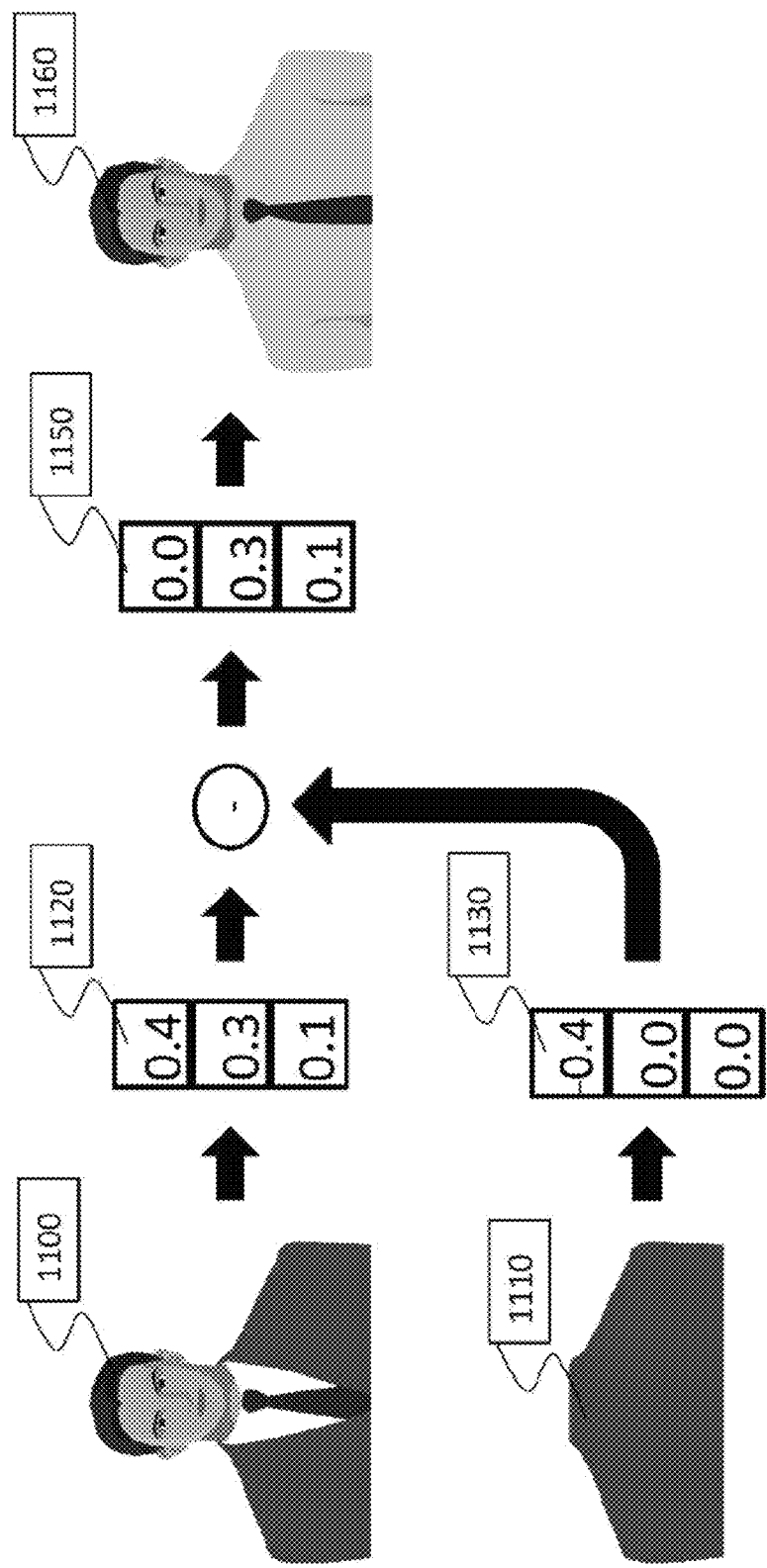
FIG. 11 is a diagram illustrating an example of image generation by semantic operation of features in the image access management according to the invention.

Next, an example of the image generation by the semantic operation of the features in the image access management according to the invention will be described with reference to FIG. 11.

As described above, in the invention, by using the CNN trained by the Semantic Triplet Loss training method, it is possible to change a specific attribute value of a feature vector and perform a semantic operation on the feature vector. By using the processing, a final image having a desired attribute can be generated. Hereinafter, an example of means for generating a final image having a desired attribute will be described.

First, means for generating a final image that does not include a specific attribute by subtracting one attribute value set from another attribute value set will be described.

The feature calculation unit (for example, the feature calculation unit 540 illustrated in FIG. 5) receives a first image 1100 that represents an object such as a male having a first attribute such as a suit jacket. Then, the feature calculation unit receives the second image 1110 that represents the first attribute. The images may be designated by the user, for example, or may be acquired from a sensor such as a surveillance camera.

Then, the feature calculation unit calculates a first attribute value set 1120 that corresponds to the object (for example, a male wearing a jacket in FIG. 11) of the first image, and a second attribute value set 1130 that corresponds to the attribute (for example, jacket of FIG. 11) of the second image. Thereafter, the feature calculation unit calculates a third attribute value set 1150 by subtracting the second attribute value set 1130 that corresponds to the attributes of the second image from the first attribute value set 1120 that corresponds to the objects of the first image.

The third attribute value set is a feature vector obtained by subtracting the second attribute value set from the first attribute value set.

Then, the image generation unit (for example, the image generation unit 560 illustrated in FIG. 5) generates an image of the object having no first attribute as a final image 1160 based on the calculated third attribute value set 1150. For example, as illustrated in FIG. 11, an image of a male who is not wearing the jacket is obtained by subtracting the second attribute value set 1130 that corresponds to the jacket from the first attribute value set 1120 that corresponds to a male who is wearing the jacket.

Next, means for generating a final image including a specific attribute is generated by adding one attribute value set to another attribute value set will be described.

The feature calculation unit receives the first image that represents the object such as a male having no first attribute such as a suit jacket. Then, the feature calculation unit receives the second image that represents the first attribute. The images may be designated by the user, for example, or may be acquired from a sensor such as a surveillance camera.

Then, the feature calculation unit calculates a first attribute value set that corresponds to the object (for example, a male who is not wearing a jacket) of the first image, and a second attribute value set that corresponds to the attribute (for example, jacket) of the second image. Thereafter, the feature calculation unit calculates a third attribute value set by subtracting the second attribute value set that corresponds to the attributes of the second image to the first attribute value set that corresponds to the object of the first image. The third attribute value set is a feature vector obtained by adding the second attribute value set to the first attribute value set.

Then, the image generation unit generates an image of the object having a first attribute as a final image based on the calculated third attribute value set. For example, an image of a male who is wearing the jacket is obtained by adding the second attribute value set that corresponds to the jacket to the first attribute value set that corresponds to a male who is not wearing the jacket.

By changing the attribute value by the semantic subtraction or the semantic addition described above, a final image including a desired attribute or a final image not including the desired attribute can be generated. In the description above, an example of inserting a specific attribute and an example of deleting a specific attribute have been described, but the semantic operation according to the invention is not limited thereto. For example, in addition to inserting or deleting specific attributes, various parameters such as the color, size, and number of objects can be adjusted.

The final image generated in this manner may be used, for example, for specifying the identity of a certain person or for hiding the identity of a certain person. For example, by appropriately changing the attributes of the final image, it is possible to freely adjust the similarity between the appearance of the person who appears in the final image and the appearance of the actual person. For example, in a case where it is desired to hide the identity of a person, the appearance of the actual person can be made different by adding a beard, sunglasses, or the like. Meanwhile, in a case where it is desired to specify the identity of a person, an image close to the original figure of the person can be generated by deleting the beard, sunglasses, or the like of the person who appears in the target image, and by inputting the image into the neural network trained so as to perform an existing object detection means, a specific person can be detected in the image.

The final image obtained by the means described above may be used, for example, for training the neural network. For example, by using the target image as ground truth and the final image having a changed attribute has been changed as a soft target, the neural network can be trained and classification accuracy can be improved.

Above, although the embodiments of the invention have been described, the invention is not limited to the above-described embodiments, and various modifications can be made without departing from the gist thereof.

What is claimed is:

1. An image access management device for managing access to an image, the device comprising:
   a feature calculation unit;
   an access management unit; and
   an image generation unit, wherein
   the feature calculation unit extracts a feature vector related to a predetermined region in a target image,
   in a case where the image access management device receives an access request to the target image, the access management unit determines a browsing level with respect to the target image according to an access authority or purpose included in the access request to the target image, wherein
   the image generation unit includes a dimension adjusting unit and an inference unit,
   the dimension adjusting unit performs processing of reducing an information amount of the feature vector according to the browsing level,
   the inference unit derives inference related to the feature vector based on the feature vector having the reduced information amount, and
   the image generation unit generates a final image (1) that corresponds to the access authority by processing the feature vector according to the browsing level, and provides the generated final image as a response to the access request and (2) based on the feature vector having the reduced information amount and the inference.

2. The image access management device according to claim 1, wherein
   the image access management device is connected to a client terminal via a communication network,
   the dimension adjusting unit uses a constraint that depends on the communication network for the feature vector, and performs processing of reducing the information amount of the feature vector, and
   the client terminal
      generates a partial image based on the feature vector by receiving the feature vector having the reduced information amount and by performing processing by a neural network, and
      generates the final image by inserting the partial image into a predetermined background image.

3. The image access management device according to claim 1, wherein
   a predetermined region of the target image includes at least a first patch and a second patch,
   the feature calculation unit extracts a first feature vector related to the first patch, and extracts a second feature vector related to the second patch, and
   the dimension adjusting unit calculates a semantic average of the first feature vector and the second feature vector to generate a third feature vector having the reduced information amount by comparing the first feature vector and the second feature vector with each other.

4. The image access management device according to claim 1, wherein
   the feature vector includes one or more attribute values that represent attributes of an object in the target image, and
   the dimension adjusting unit performs processing of reducing the information amount of the feature vector by changing the attribute values.

5. The image access management device according to claim 4, wherein
   the feature calculation unit
      receives a first image that represents an object having a first attribute, and a second image that represents the first attribute,
      calculates a first attribute value set that corresponds to the object based on the first image,
      calculates a second attribute value set that corresponds to the first attribute based on the second image, and
      changes the attribute values of the first image by calculating a third attribute value set by subtracting the second attribute value set from the first attribute value set, and
   the image generation unit generates an image of the object having no first attribute based on the third attribute value set.

6. The image access management device according to claim 4, wherein
   the feature calculation unit
      receives a first image that represents an object having no first attribute, and a second image that represents the first attribute,
      calculates a first attribute value set that corresponds to the object based on the first image,
      calculates a second attribute value set that corresponds to the first attribute based on the second image, and
      changes the attribute values of the first image by calculating a third attribute value set by adding the second attribute value set to the first attribute value set, and
   the image generation unit generates an image of the object having the first attribute based on the third attribute value set.

7. An image access management method executed by an image access management device for managing access to an image, wherein
   the image access management device includes a feature calculation unit, an access management unit, and an image generation unit, and
   the image access management method comprises:
      a step of extracting a feature vector related to a predetermined region in a target image, by the feature calculation unit;
      a step of determining a browsing level with respect to the target image according to an access authority or purpose included in the access request to the target image, in a case where the image access management device receives an access request to the target image, by the access management device;
      a step of generating a final image that corresponds to the access authority by processing the feature vector according to the browsing level, by the image generation unit; and
      a step of providing the final image as a response to the access request, wherein the image generation unit includes a dimension adjusting unit and an inference unit, and the step of generating the final image includes
- a step of performing processing for reducing an information amount of the feature vector according to the browsing level, by the dimension adjusting unit,
- a step of deriving inference related to the feature vector based on the feature vector having the reduced information amount, by the inference unit, and
- a step of generating the final image based on the feature vector having the reduced information amount and the inference, by the image generation unit.

8. The image access management method according to claim 7, wherein
the image access management device is connected to a client terminal via a communication network, and
the step of generating the final image includes
- a step of using a constraint that depends on the communication network for the feature vector, and performs processing of reducing the information amount of the feature vector, by the dimension adjusting unit,
- a step of generating a partial image based on the feature vector by receiving the feature vector having the reduced information amount and by performing processing by a neural network, by the client terminal, and
- a step of generating the final image by inserting the partial image into a predetermined background image.

9. The image access management method according to claim 7, wherein
a predetermined region of the target image includes at least a first patch and a second patch,
the image access management method further comprises:
- a step of extracting a first feature vector related to the first patch, and a step of extracting a second feature vector related to the second patch, by the feature calculation unit; and
- a step of calculating a semantic average of the first feature vector and the second feature vector to generate a third feature vector having the reduced information amount by comparing the first feature vector and the second feature vector with each other, by the dimension adjusting unit.

10. The image access management device according to claim 7, wherein
the feature vector includes one or more attribute values that represent attributes of an object in the target image, and
the image access management method further comprises:
a step of performing processing for reducing the information amount of the feature vector by changing the attribute values, by the dimension adjusting unit.

11. The image access management method according to claim 10, further comprising:
a step of receiving a first image that represents an object having a first attribute, and a second image that represents the first attribute, a step of calculating a first attribute value set that corresponds to the object based on the first image, a step of calculating a second attribute value set that corresponds to the first attribute based on the second image, and a step of changing the attribute values of the first image by calculating a third attribute value set by subtracting the second attribute value set from the first attribute value set, by the feature calculation unit; and
a step of generating an image of the object having no first attribute based on the third attribute value set, by the image generation unit.

12. The image access management method according to claim 10, further comprising:
a step of receiving a first image that represents an object having no first attribute, and a second image that represents the first attribute, a step of calculating a first attribute value set that corresponds to the object based on the first image, a step of calculating a second attribute value set that corresponds to the first attribute based on the second image, and a step of changing the attribute values of the first image by calculating a third attribute value set by adding the second attribute value set to the first attribute value set, by the feature calculation unit; and
a step of generating an image of the object having the first attribute based on the third attribute value set, by the image generation unit.

13. An image access management system for managing access to an image, the system comprising:
an image access management device including a feature calculation unit, an access management unit, and an image generation unit;
a sensor device that acquires a target image; and
a client terminal that creates and sends an access request to the target image, wherein
the image access management device, the sensor device, and the client terminal are connected to each other via a network,
the feature calculation unit acquires the target image from the sensor device and extracts a feature vector related to a predetermined region in the target image,
in a case where the image access management device receives an access request to the target image from the client terminal, the access management unit determines a browsing level with respect to the target image according to an access authority or purpose included in the access request to the target image, wherein
the image generation unit includes a dimension adjusting unit and an inference unit,
the dimension adjusting unit performs processing of reducing an information amount of the feature vector according to the browsing level,
the inference unit derives inference related to the feature vector based on the feature vector having the reduced information amount, and
the image generation unit generates a final image (1) that corresponds to the access authority by processing the feature vector according to the browsing level, and provides the generated final image as a response to the access request from the client terminal and (2) based on the feature vector having the reduced information amount and the inference.

* * * * *